United States Patent [19]
Holtrop

[11] Patent Number: 6,060,982
[45] Date of Patent: May 9, 2000

[54] BICYCLE ANTI-THEFT ALARM SYSTEM

[76] Inventor: Perryn H. J. Holtrop, 13031 Gorham St., Moreno Valley, Calif. 92553

[21] Appl. No.: 09/067,023

[22] Filed: Apr. 27, 1998

[51] Int. Cl.$^7$ ........................................................ B62J 3/00
[52] U.S. Cl. .......................... 340/432; 340/427; 340/429; 340/568.1; 340/571
[58] Field of Search .................................... 340/573, 539, 340/432, 427, 571, 568.1, 572, 429

[56] References Cited

U.S. PATENT DOCUMENTS

| | | | |
|---|---|---|---|
| 3,824,540 | 7/1974 | Smith, II | 340/571 |
| 4,151,506 | 4/1979 | Schoenmetz | 340/427 |
| 4,188,614 | 2/1980 | Habib | 340/427 |
| 4,885,572 | 12/1989 | Iwata et al. | 340/426 |
| 5,534,847 | 7/1996 | McGregor | 340/572 |
| 5,597,225 | 1/1997 | Davis | 362/72 |
| 5,764,135 | 6/1998 | Warren | 340/427 |
| 5,815,069 | 9/1998 | Horton | 340/427 |

*Primary Examiner*—Daniel J. Wu
*Assistant Examiner*—Anh La
*Attorney, Agent, or Firm*—Chris Papageorge

[57] ABSTRACT

The anti-theft alarm system includes a base unit which is shaped and sized to fit in a bicycle accessory such as a water bottle or to fit on a water bottle cage or on a bicycle component such as a seat frame at a location where it is concealed from view. The base unit has a microprocessor and a shock sensor which in reponse to tilt or other movement of the sensor (and bicycle) allows electrical current to flow through the microprocessor which outputs a signal into either just an alarm in some embodiments or into both a radio transceiver and an alarm in other embodiments. The transceiver emits a signal to a remote unit which is sufficiently compact that it may be carried by a user and which includes a second transceiver and an auditory or vibration alarm. The second transceiver activates the auditory or vibration alarm in response to receipt of the signal from the transceiver of the base unit thereby alerting the user to theft or attempted theft of the bicycle.

24 Claims, 14 Drawing Sheets

BICYCLE ANTI-THEFT ALARM SYSTEM

BACKGROUND OF THE INVENTION

The invention relates generally to anti-theft systems for bicycles and, more particularly, to such systems which utilize an alarm to deter thievery and have remote capabilities. The system utilizes a motion sensor to respond to attempted theft of the bicycle and is cryptically mounted on a bicycle component or accessory so as to be out of the field of view of the would be thief thereby preventing tampering with the system.

With the proliferation of bicycling as a leisure time activity and sport, bicycles have become increasingly more sophisticated. The introduction of bicycles specialized for uses such as mountain trail riding has opened up more markets for bicycles and increased demand for bicycles and broadened their appeal. This has produced an increasingly larger market for relatively expensive bicycles. The use of more sophisticated metals and materials has produced more efficient and effective bicycles. This has also produced a demand for bicycles which have the capabilities of such technologically sophisticated bicycles but which are priced relatively inexpensively. Consequently, this burgeoning demand in combination with the high retail cost of such bicycles has caught the attention of both amateur and professional thieves. Since, unlike automobiles and motorcycles, bicycle ownership does not require title registration or license plates, the theft, sale and use of stolen bicycles is difficult to trace and prove in court. Consequently, bicycle thieves and (as well as) purchasers of stolen bicycles are not likely to be unduly worried about apprehension or conviction for such crimes. As a result, a black market for stolen bicycles has proliferated.

In an attempt to thwart theft of bicycles, many types of theft protection systems and device designs have been marketed. The most popular of these systems and devices have included a lock. However, since many of these locks can be pried open or cut open with a hacksaw, the designers of such systems have sought to include harder materials or make the lock more inaccessible to pry or cut open with conventional tools. Nevertheless, all of these lock systems can be defeated with the proper tools and sufficient time to use the tools.

Other types of anti-theft systems rely on an alarm to thwart attempted theft of a protected bicycle. Such systems typically use a motion sensitive device to respond to attempted theft of the bicycle. An example of such a system is disclosed in U.S. Pat. No. 3,828,310 to Miller. The Miller device is designed to be clamped onto the bicycle frame. However, a primary disadvantage of the Miller system is that it is completely exposed to view of would be thieves and is readily identifiable as an alarm system. Consequently, such systems are vulnerable to tampering.

Other types of theft protection systems have remote capabilities for alerting the owner of the bicycle who may be at a remote location. An example of such a system is disclosed in U.S. Pat. No. 5,538,847 to McGregor. The McGregor system is designed to be clamped onto the bicycle frame and utilizes a motion sensor and an alarm. Thus, a would be thief who attempts to pick up the bicycle or ride it off would activate the alarm and likely scare off the thief.

Other types of bicycle anti-theft alarm systems are designed to be compact and thus are specifically designed to be mounted on bicycles which inherently have space and weight limitations. These systems are thus less easily discernable from other bicycle accessories and components and consequently less likely to be tampered with than other more conventional bicycle anti-theft alarm systems. In addition, their lighweight and compactness make them less likely to hamper use of the bicycle. Two examples of such systems are disclosed in U.S. Pat. No. 4,980,667 to Ames and U.S. Pat. No. 5,023,596 to Sirman which both utilize motion sensors to respond to actions constituting attempted theft of the bicycle on which used.

However, a primary disadvantage of these prior art alarm systems for bicycles is that they are all positioned within the clear view of passers-by and thus also would be thieves. This gives thieves the easy opportunity to study such systems and determine how to disable them. In addition, since the alarm system is in clear view of the thief, the thief also has the opportunity to determine how to detach the system from the bicycle and thereby misappropriate the system for his own use or for resale. Since there is a strong demand for bicycle anti-theft systems and many bicycle anti-theft alarm systems are expensive, there may be such a strong black market for such alarm systems that misappropriation of such alarm systems might be more profitable than misappropriation of the bicycle.

Another disadvantage of these prior art alarm systems for bicycles is that they all rely on scaring off the thief by means of a presumably loud alarm. However, such an alarm may not discourage some thieves who may not think that there is anyone in the vicinity who would be willing to or able to take the necessary action to stop the theft. In addition, for some thieves, stealing a bicycle while its alarm is blaring may add some desired excitement or challenge to the thievery thus making stealing a bicycle equiped with such an alarm system more desirable.

The above described systems do not completely protect either the bicycle or the anti-theft systems per se from thievery. Instead, the easy visibility of such prior art systems due to the fully exposed characteristic of conventional bicycles makes them particularly vulnerable to tampering as well as theft. In addition, these prior art systems are not able to alert the bicycle owner (particularly if at a remote location) to an attempted theft who would typically have more incentive to thwart the attempted theft than bystanders and passers-by. What is therefore needed is an anti-theft system for bicycles which has remote capabilities for alerting a bicycle owner who may be at a remote location. What is also needed is an anti-theft system for bicycles which is cryptically located on the bicycle in order to conceal its existence and thereby its accessibility to tampering and its availability for theft from would be thieves.

SUMMARY OF THE INVENTION

It is a principal object of the present invention to provide an anti-theft system which is self contained and sized and shaped so that it may be cryptically mounted on a bicycle component or accessory thereby concealing its existence from would be thieves.

It is another object of the present invention to provide an anti-theft system for a bicycle which is capable of alerting a user situated at a location remote from the bicycle of an attempted theft thereof.

It is another object of the present invention to provide an anti-theft system for a bicycle which has remote control capabilities.

It is an object of the present invention to provide an anti-theft system for a bicycle which has miniaturized components for reduced size thereof thereby enhancing its concealment capability.

It is another object of the present invention to provide an anti-theft system for a bicycle which is compact and lightweight so that it does not compromise use of the bicycle.

It is an object of the present invention to provide an anti-theft system for a bicycle which is capable of responding to sudden movement thereof comprising theft or attempted theft of the bicycle.

It is also an object of the present invention to provide a anti-theft system for a bicycle which has auditory alarm capabilities.

It is also an object of the present invention to provide an anti-theft system for a bicycle which has vibration alarm capabilities.

It is also an object of the present invention to provide an anti-theft system for bicycle which has minimal circuitry to minimize size and cost thereof.

It is also an another object of the present invention to provide an anti-theft system for a bicycle which is manually removable from the bicycle.

Essentially, the anti-theft system of the present invention is an electronic system which provides a reliable means for alerting the user of an attempted theft of his or her bicycle. The anti-theft system is specifically adapted to be cryptically mounted on a bicycle component or accessory. In this way it is concealed from would be thieves who might otherwise tamper with the system in an attempt to disarm it or to steal the system itself. Since bicycle components and accessories are generally external to the bicycle and thus exposed to others in the general vicinity, any prior art type of anti-theft system would typically be in plain view of those proximal thereto. Although the incorporation of an led communicating the presence of an anti-theft system may discourage thievery of an automobile, such automobile anti-theft systems are typically locked inside the automobile and thereby protected from tampering. In contrast, visual exposure of an anti-theft system on a bicycle makes such a system vulnerable to examination and tampering by would be thieves and consequently makes it more likely that the would be thief would be successful in disarming the system. Their visual exposure allows would be thieves to be able to identify the type of anti-theft system such that those familiar with the particular type of system would be knowledgeable of its weaknesses. In addition, visual exposure of the system allows would be thieves to be able to visually study the system without risking setting off the alarm and without having to do anything illicit and determine how to disarm or disable the system prior to attempting to misappropriate the bicycle.

Since a primary shortcoming of conventional anti-theft alarm systems for bicycles is that their visual exposure to others makes them less effective as theft protection, a primary advantage of the present invention over conventional anti-theft systems is that it is concealed from the view of others. This concealment is accomplished by sizing and shaping the system so that it can be mounted on or integral with a bicycle component or accessory thereby appearing to be a part of the component or accessory or simply positioned therein so as to be covered thereby and thus out of sight. To the casual observer, the bicycle includes nothing out of the ordinary. A thief would not be likely to think that the bicycle is equiped with a theft protection device until an attempt is made to steal the bicycle resulting in activation of the alarm and/or notification to the user of the attempted theft. The system of the present invention thus overcomes the vulnerability of conventional bicycle alarm systems to tampering thereby helping to ensure that the system will remain operational and able to perform its desired task of responding to theft or attempted theft and thereby providing a more reliable anti-theft system.

The objective of concealment of the anti-theft system is accomplished through miniaturization of the components of the system as well as minimization of the number of components and sizing and shaping the system to accomodate the bicycle component or accessory deemed most effective for concealment of the system. In addition, the structures of the system are designed for mounting directly on or in the bicycle component and/or accessory and for sustaining the shocks and stresses to which subjected during such use. In this regard, the system does not utilize a conventional housing as is typical for electronic devices because this would undesirably alert the would be thief to the use of an electronic device on the bicycle. Such a electronic device housing would be likely to result in the would be thief moving closer to scrutinize the device especially if contemplating misappropriating the bicycle. Instead, the system is provided solely with components needed to perform the desired sensing, alarm and related tasks without the inclusion of a circuitry casing or housing. This allows the circuitry board and related structures to be mounted directly onto the bicycle component or accessory so that this bicycle does not appear to have anything out of the ordinary. Instead of a typical housing, one embodiment of the present invention includes a cover which is colored to match the bicycle component or accessory to which mounted thereby providing visual camouflage of the system. In addition, the textural characteristics of the cover are selected to match those of the bicycle component or accessory so that it appears that the system is composed of the same material and therefore is simply part of that component or accessory. This cover is removable so that the base unit may be mounted on another type of component or accessory and positioned within that component or accessory so that it does not require visual camouflage.

Since the base unit in one embodiment is mounted on a bicycle component which is typically composed of metal and therefore may short circuit or have other adverse effects on the electronic components and electrical circuits thereof, the base unit is provided with a insulator positioned between the circuit board and the component or accessory on which mounted. In addition, since the bicycle component on which the base unit is mounted may transmit shocks caused by riding on rough terrain, etc. directly to the circuit board which is susceptable to cracking or other type of damage thereto, the base unit is provided with a rubber mount to protect the circuit board and electronic components thereof from such shocks. These system components not only make the base unit more durable and able to sustain the rigors of bicycle riding but also allow the base unit to be mounted directly on the bicycle component or accessory as required thereby providing a reliable, durable and long lasting alarm system.

In other embodiments of the invention, the base unit also includes a radio transmitter which is responsive to the sensor and which emits a signal to a separate receiver. The receiver is electrically and operatively connected to a second alarm. The receiver and the second alarm are both mounted within a casing which is preferably carried by the user. Thus, in response to sudden movement of the base unit, both alarms are activated; the first alarm is activated primarily to scare off the thief and the second alarm is activated to alert the user of the attempted theft.

In some embodiments, the base unit of the anti-theft system is designed for generally permanent or semi-permanent attachment to a bicycle component such that the base unit is left on the bicycle whether armed and in use or not. However, in other embodiments, the base unit is attached to the bicycle accessory which allows it to be removed from the bicycle when desired. This allows the base unit (or the entire system) to be packed away or carried by the user when not deemed needed to protect the bicycle.

DETAILED DESCRIPTION OF THE PREFERRED EMBODIMENTS

Figure 1:
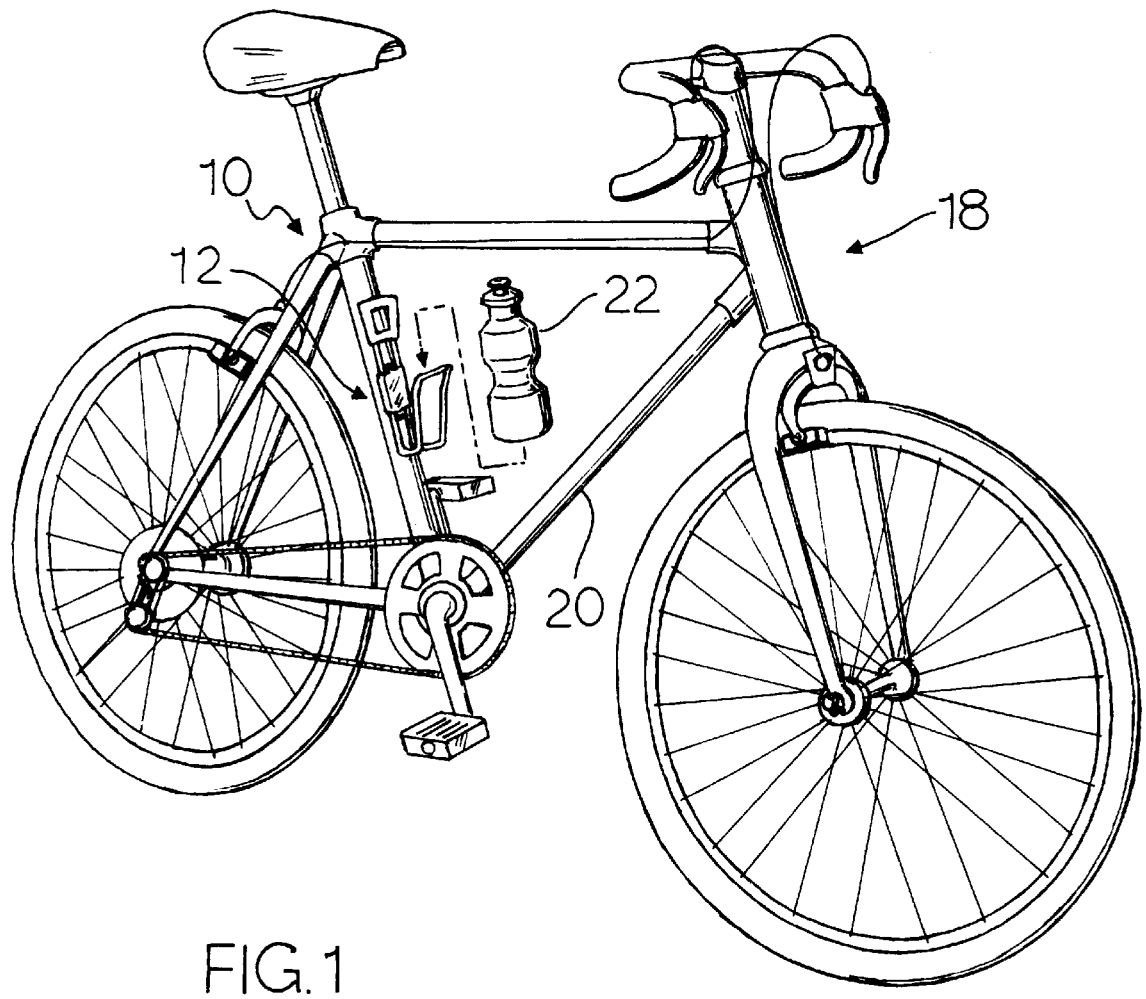
FIG. 1 is a perspective view of a first embodiment of the invention shown attached to a bicycle frame and appearing as part of a water bottle cage.
Figure 2:
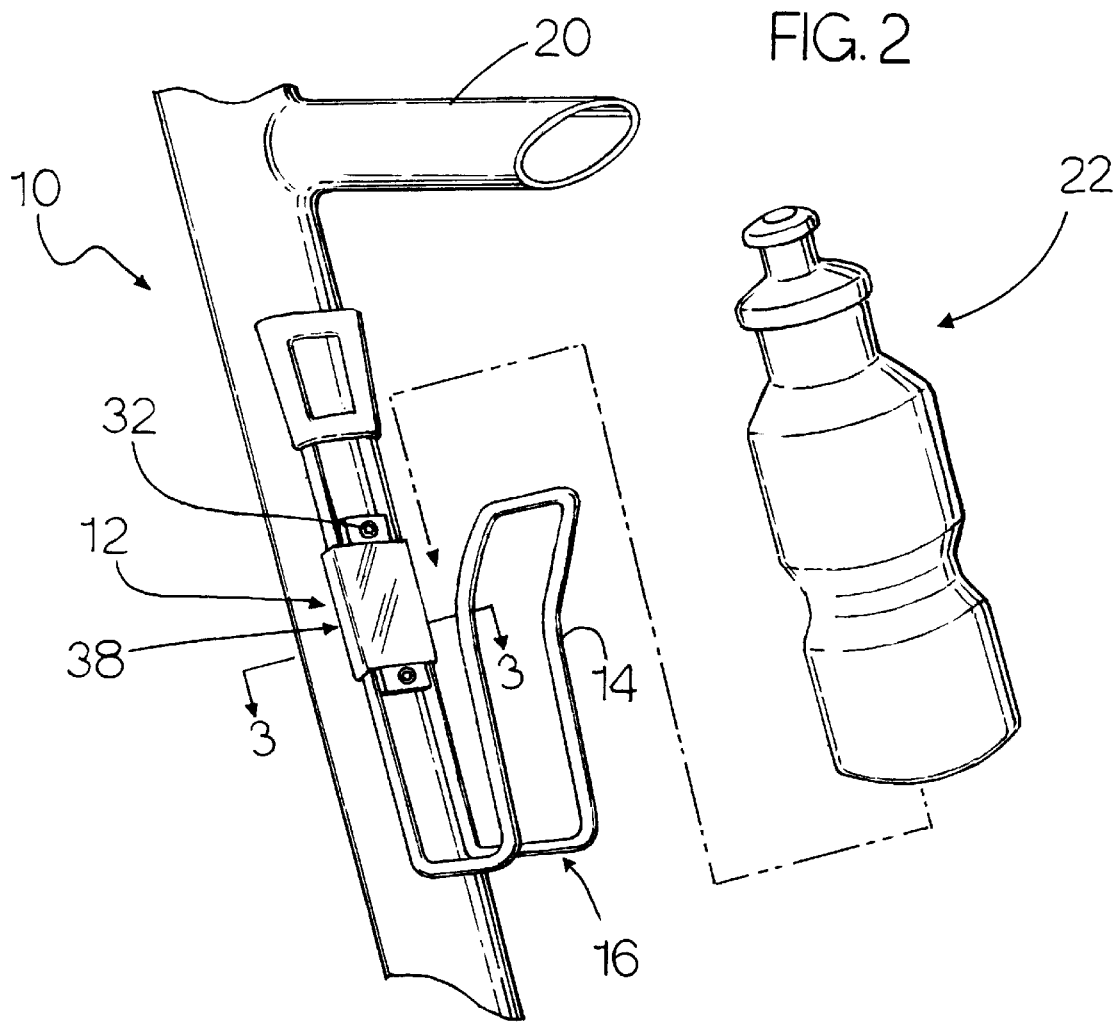
FIG. 2 is a perspective view of the first embodiment of the invention showing the mounting and components thereof in more detail.
Figure 3:
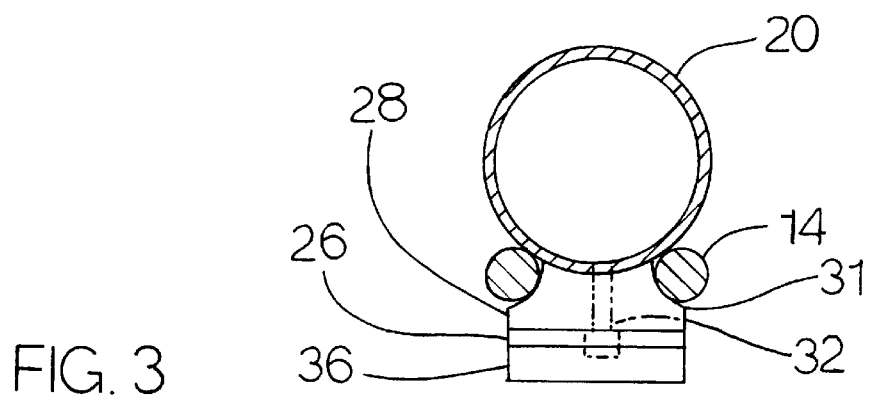
FIG. 3 is a cross-sectional view of the first embodiment of the invention and bicycle frame to which attached taken along lines 3—3 of FIG. 2.

Referring now to the drawings, the first embodiment of the anti-theft system of the present invention is generally designated by the numeral 10. The anti-theft system 10 includes a base unit 12. The base unit 12 is preferably approximately three inches by two inches by one-half inch so that it is sufficiently compact that it may be positioned between the component rods 14 of a water bottle cage 16 of a bicycle 18, as shown in FIGS. 1, 2 and 3. The base unit 12 is thus mounted on the bicycle frame 20 and on the cage 16. Preferably, the base unit 12 is screwed onto the bicycle frame 20 or otherwise securely mounted thereon so as to also retain and secure the rods of the cage 16 onto the bicycle frame 20. In addition, the base unit 12 is positioned at a location where it is covered by the water bottle 22 and concealed thereby when the water bottle is placed in the cage 16, as shown in FIGS. 1 and 2. More specifically, preferably only the face portion 19 of the base unit 12 is completely covered by the water bottle 22 when placed in the cage 16. Instead of being positioned adjacent to the rods 14 of the cage 16, the base unit 12 may be constructed so that it is integral with the cage 16 and thus, more specifically, so that the base plate 26 is unitary with the rods 14.

The base unit 12 preferably includes an electronic circuit board 24 and a base plate 26 at a lower face thereof for providing structural strength to the circuit board 24 enabling it to withstand the rigors of bicycle riding without breaking, cracking, etc. The base plate 26 is preferably composed of a stiff plastic material or other type of suitable material which is electrically nonconducting in order to prevent shorting together the traces of the circuit board 24.

Figure 10:
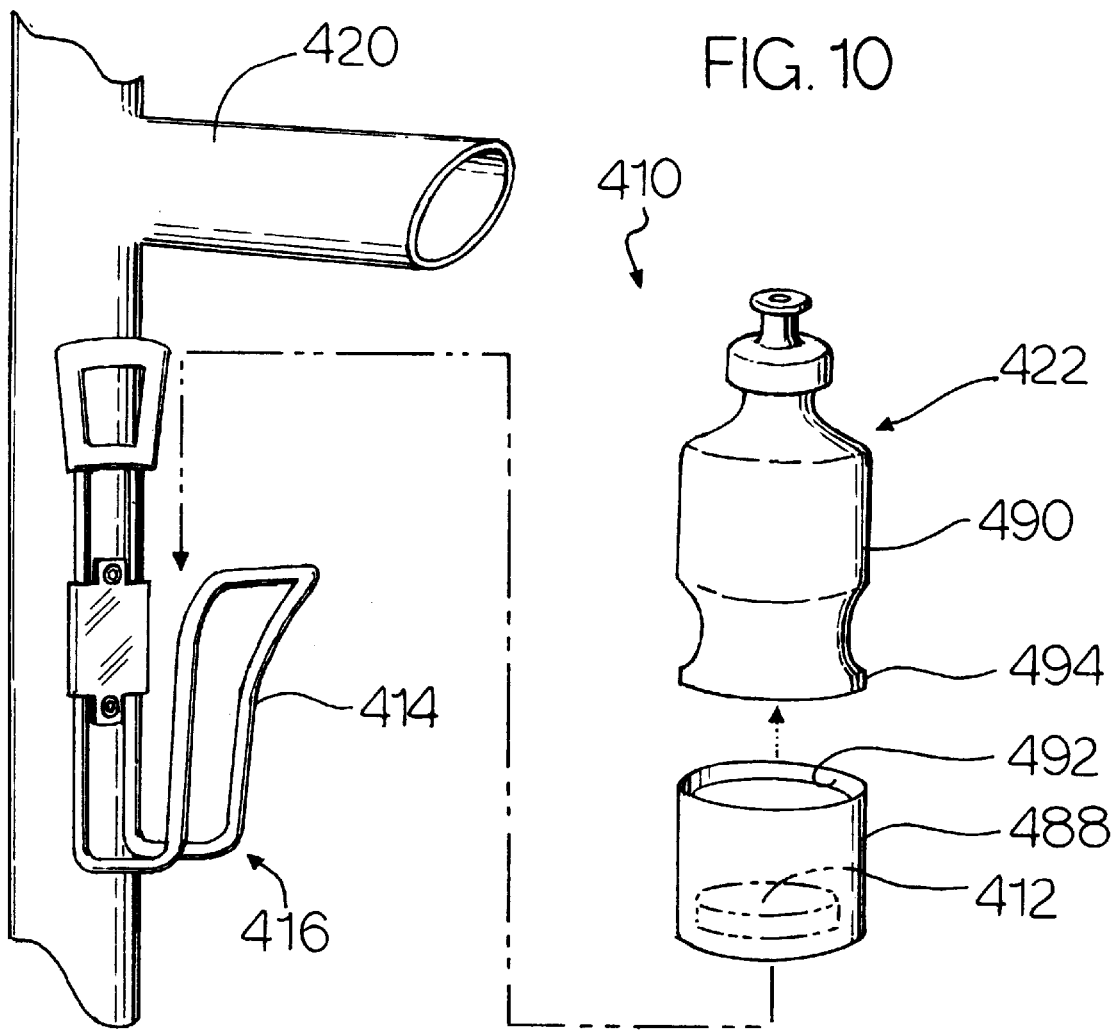
FIG. 10 is a perspective view of a fifth embodiment of the invention attached to a water bottle at a bottom portion thereof and shown in phantom.

The base unit 12 preferably also includes a mount 28 which is preferably composed of rubber or other suitable resilient material which is able to absorb shocks transmitted thereto when the bicycle is ridden over bumps, potholes and the like. Thus, the mount 28 prevents shocks from being transmitted to the circuit board 24. The mount 28 is preferably attached to the base plate 26 at a lower face thereof (as shown in FIG. 10) and is positioned between the base plate 26 and the bicycle frame 20 when the base unit is mounted on the frame 20. The mount 28 preferably has recessed portions 31 which receive the rods 14 to provide a better fit on the cage 16.

Figure 4:
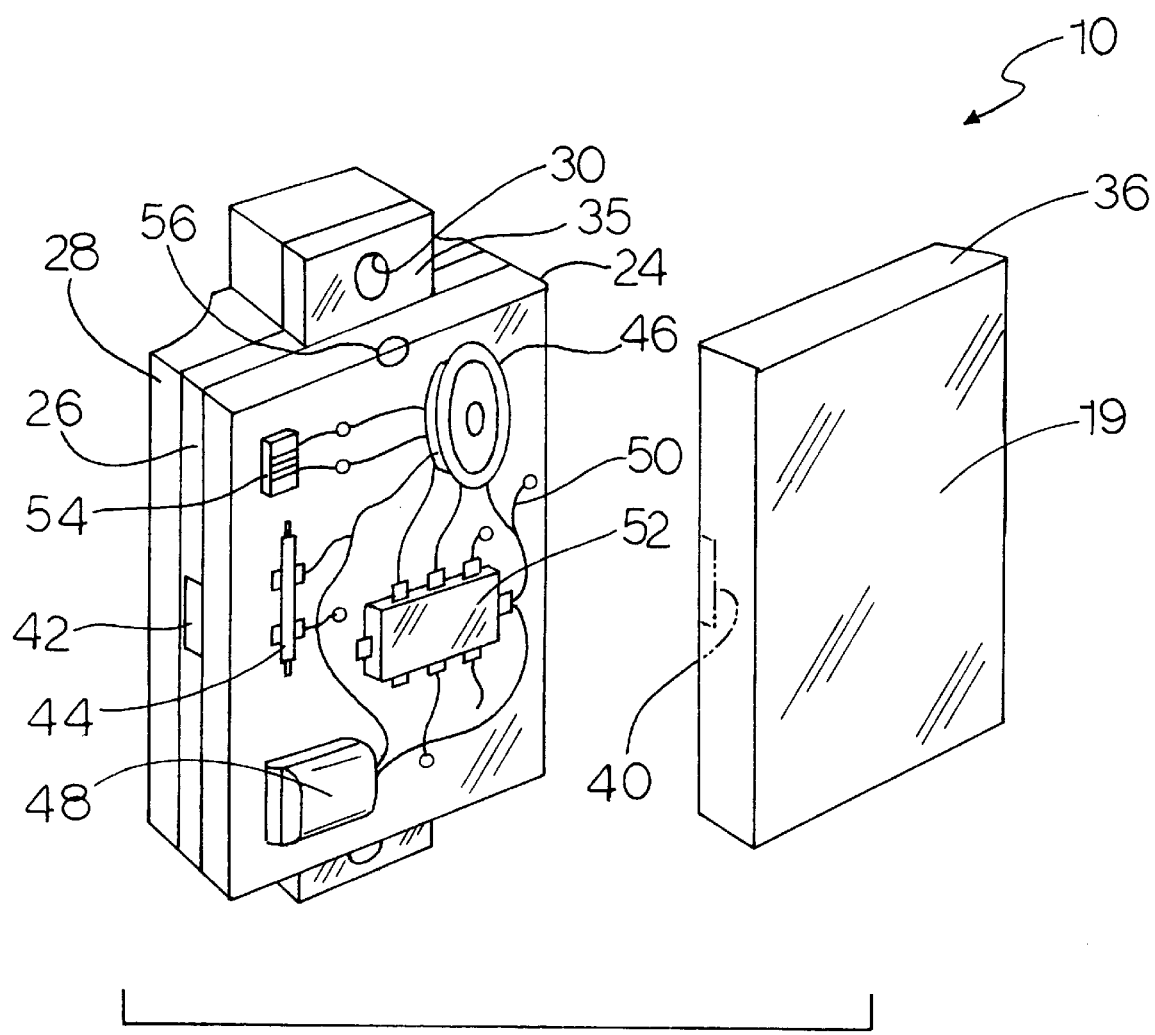
FIG. 4 is a perspective view of the first embodiment of the invention showing the cover separated from the base unit thereof.

The base unit 12 also is provided with apertures 30 for receiving mounting screws 32 for screwing the base unit 12 onto the frame 20. The apertures preferably extend through the base plate 26 and the mount 28. The apertures 30 are preferably located at mounting ears 35 at the longitudinal ends 34 of the circuit board 24, base plate 26 and mount 28, as shown in FIG. 4. Alternatively, however, the base unit 12 may utilize mounting bolts rather than screws 32 and the apertures may instead be provided directly in the longitudinal ends 34 of the circuit board 24 and the base plate 26.

The base unit 12 also is provided with a cover 36 which is preferably removably mounted on the circuit board 24 (as well as the base plate 26 and mount 28) via conventional snap-on means 38. The snap-on means 38 preferably includes a pair of clip structures 40 mounted at the sides of the cover 36 which engage with a pair of seats 42 mounted at the corresponding sides of preferably the base plate 26. The snap-on means 36 enable manual attachment and detachment of the cover 36 to and from the base plate 26 and circuit board 24 as well as the mount 28. The cover 36 preferably covers the circuit board 24 as well as the base plate but not the mount 28. The cover 36 protects the circuit board 24 from dirt, moisture, etc. More importantly, however, the cover 36 enables the base unit 12 to take on the appearance of an adjacent bicycle component, accessory or the like so that the base unit appears to be such a conventional bicycle component, accessory or the like. This is effectuated by providing the cover with a metallic color and texture so that it has the appearance of a bracket for the metal rods 14 of the cage. The size and shape of the cover 36 is also selected so that it appears to be such a bracket. Specifically, the cover 36 has five straight panels (or sides) joined together at rights angles so that the entire base unit 12 is generally rectangular in cross-section (except for the recessed portion of the mount 28), as shown in FIG. 3. Thus, the cover 36 (and the base unit 12 generally) is visually camouflaged by the proper color, shape and size selection. Additionally, the cover 36 serves to hide the underlying circuit board 24 from view so that a viewer cannot discern that the base unit is an electronic device or part of an electronic system. In this regard, it is important to note that utilization of the cover 36, base plate 26 and mount 28 obviates the need or use for a housing for the base unit. Elimination of such a housing reduces the size of the base unit 12 thereby providing the important advantage of enhanced compactness thereof and enabling it to fit in a variety of locations on or in the bicycle, its components or its accessories.

The circuit board 24 preferably includes a shock sensor 44, an auditory alarm 46 and a battery 48 mounted thereon and electrically connected to the traces 50 thereof. The shock sensor 44 preferably is responsive to sudden movements of sufficient intensity and sufficient duration that they are deemed to result from an attempted theft of the bicycle 18 rather than someone or something innocently bumping into the bicycle or from the wind or other innocuous action. The auditory alarm 46 preferably provides sufficient sound intensity to alert the user of an attempted theft and/or scare off the would thief. The preferred sound intensity level is approximately one hundred and ten decibels. The battery 48 is preferably a standard nine volt battery. The circuit board 24 also includes a microprocessor 52 which electrically interconnects the sensor 44 and the alarm 46 and operates to activate the alarm 46 in response to activation of the sensor 44. Since there is a minimum of available of space on a typical bicycle on which to mount accessories and the like due to the narrow sizing and rounded design of the bicyle framework and components and the desirability of avoiding added weight and clutter that would hamper or compromise the user's operation of the bicycle, the shock sensor 44, auditory alarm 46 and battery 48 are preferably miniaturized to minimize the size of the circuit board 24 thereby enabling it to fit unobtrusively at various locations on the bicycle framework, components or accessories.

The system 10 is preferably manually armed by means of a switch 54 located on the circuit board 24. The circuit board 24 includes an led 56 mounted thereon and electrically connected to the traces 50. The led 56 is preferably not covered by the cover 36 so that its light is able to be seen to signal the user that the system is armed.

Figure 5:
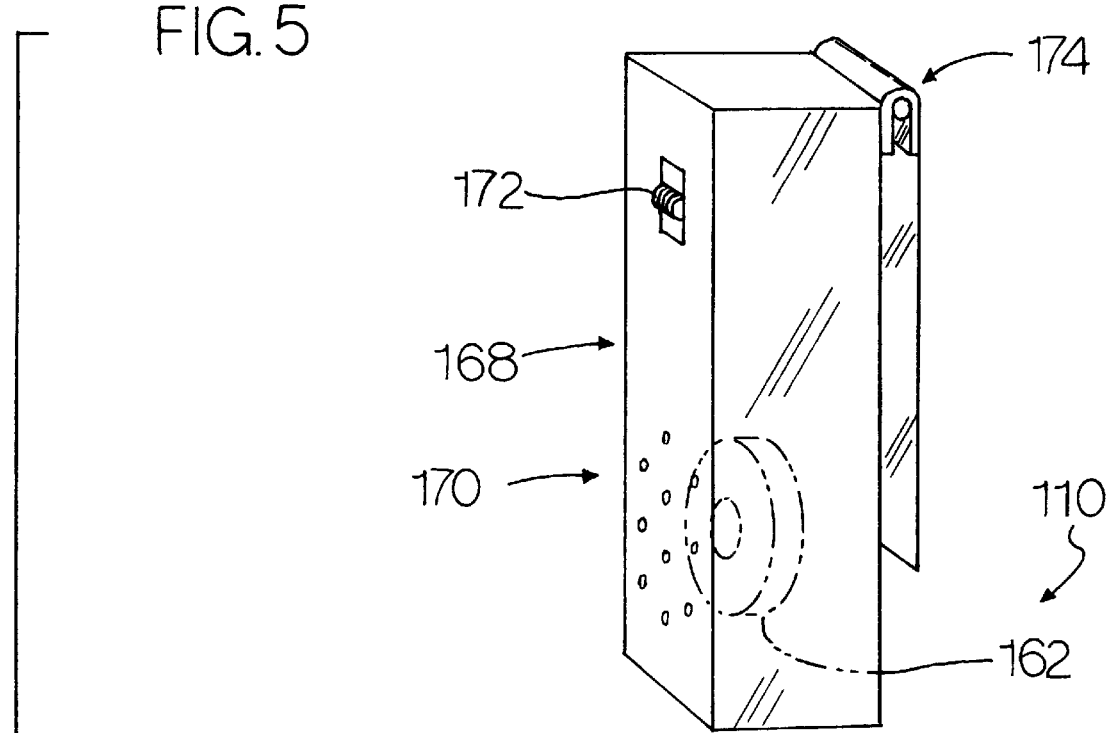
FIG. 5 is a perspective view of a second embodiment of the invention showing the component base and remote units thereof.
Figure 5:
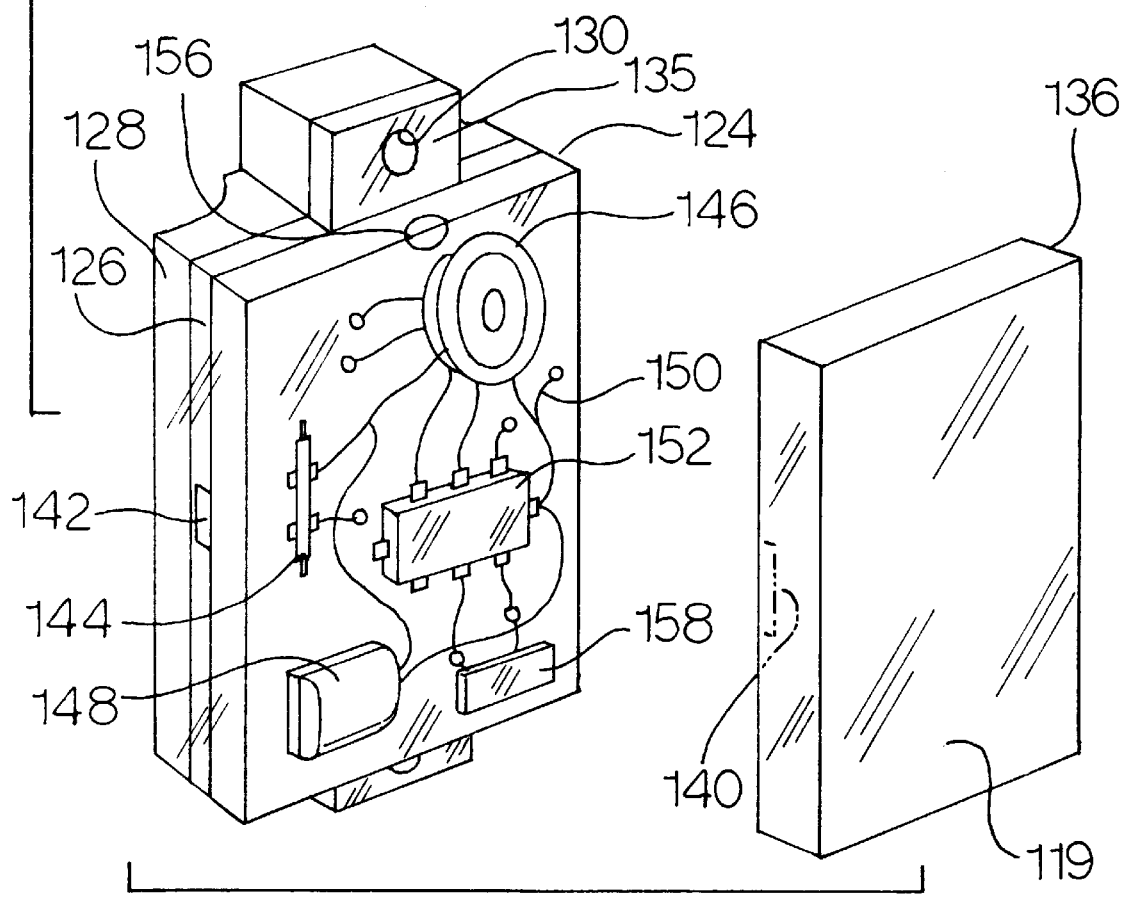

FIG. 5 shows a second embodiment 110 of the invention which includes all the component structures of the first embodiment 10 with the addition of structures providing remote capabilities to the invention. The second embodiment 110 thus includes a base radio transceiver 158 mounted on a circuit board 124 having a microprocessor 162 and a base unit 112 having the same components as base unit 12 of embodiment 10. The base transceiver 158 is responsive to a shock sensor 144 for emitting an electromagnetic signal to a separate remote transceiver 160 which is electrically and operatively connected to a second (remote) alarm 162 and to a second (remote) microprocessor 164. The remote alarm 162 is preferably an auditory alarm, although it may also be a vibration alarm, if desired. A second (remote) battery 166 is electrically connected to the remote microprocessor 164 for powering the remote subsystem or unit 170. The transceiver 160, the remote alarm 162, the remote battery 166 and remote microprocessor 164 are mounted within a casing 168 for carrying thereof by the user. Thus, in response to sudden movement of the bicycle 118, both alarms 146 and 162 are activated; the first alarm 146 is activated primarily to scare off the thief and the second alarm 162 is activated to alert the user of the attempted theft. The circuit board 124 is also attached to a rigid base plate 126 which in turn is attached to a rubber mount 128. The base unit 112 also includes apertures 130 extending through the base plate 126 and mount 128 for receiving mounting screws 132. A cover 136 is mounted on the base plate 126 (and circuit board 124) via snap-on means 138 comprising clip structures 140 and seats 142. The base unit 112 may optionally include a transmitter rather than a transceiver and the remote unit 170 may optionally include a receiver rather than a transceiver, if desired for simplicity of construction and operation.

The remote subsystem 170 also preferably includes a control switch 172 electrically connected to the remote transceiver 160 for transmitting a signal to the base transceiver 158 for arming and disarming the base unit 112. As with embodiment 10, the led 156 mounted on the base unit 112 signals the user that the base unit 112 is armed. The remote unit 170 preferably also includes a belt clip device 174 to facilitate carrying thereof by the user.

Figure 6:
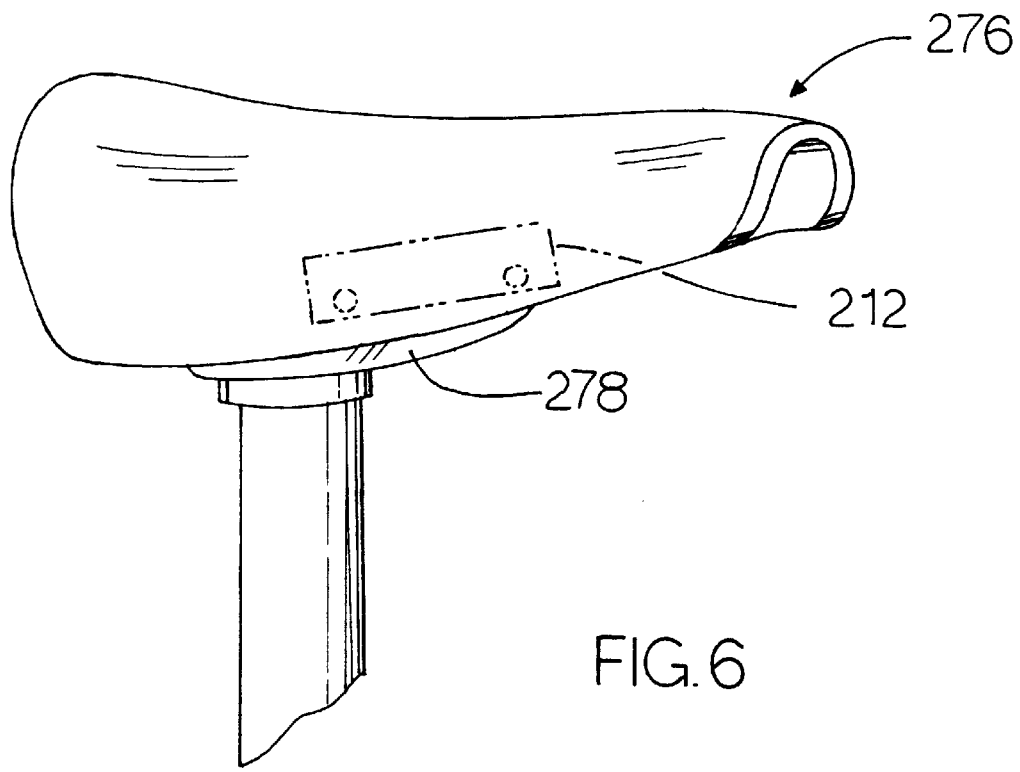
FIG. 6 is a perspective view of a third embodiment of the invention attached to a bicycle seat at an underside surface thereof and shown in phantom.
Figure 7:
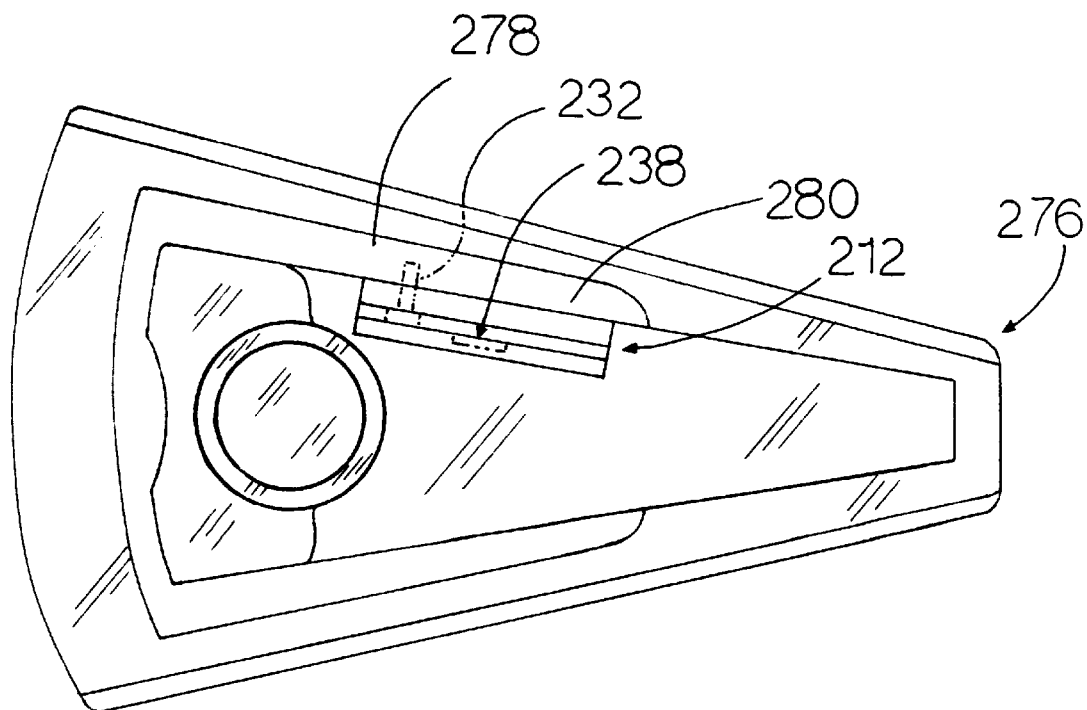
FIG. 7 is a side view of the third embodiment of the invention and the bottom of the bicycle seat to which attached showing the positioning of the third embodiment in more detail.
Figure 8:
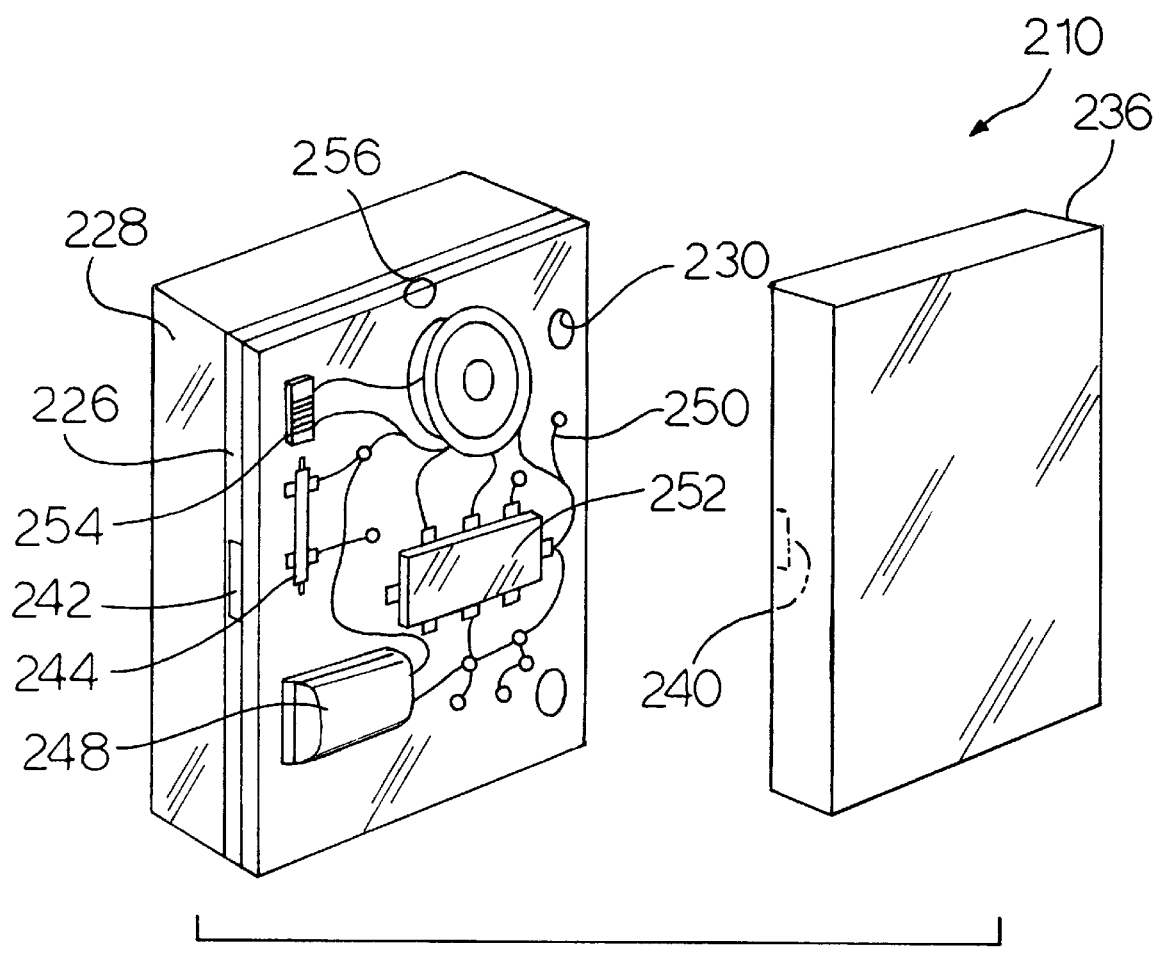
FIG. 8 is a perspective view of the third embodiment of the invention showing the cover separated from the base unit thereof.

FIGS. 6, 7 and 8 show a third embodiment 210 of the invention. The third embodiment 210 is essentially identical to the first embodiment 10 except that the third embodiment is adapted for mounting under the seat 276 of the bicycle 218 rather than at the water bottle cage. The apertures 230 of the circuit board 224(and base plate 226 and mount 228) are thus located at one lateral side 284 of the circuit board (rather than at the longitudinal ends thereof as in the design of embodiment 10). This enables the base unit 212 to be screwed (via mounting screws 232) onto the seat frame 278 at a generally straight and flat portion thereof so that the base unit 212 is positioned above the lower edge 280 of the seat frame 278, as shown in FIGS. 6 and 7. The base unit 212 is thus positioned at a location in which it is generally covered by the seat thereby placing it out of view of the casual observer. The base unit 212 is also dimensioned so that it is narrow relative to the seat height in order to provide sufficient space between the seat 276 and the base unit 212 that vertically downward movement of the top portion 282 of the seat 276 when the user is seated thereon and during use of the bicycle 218 does not result in the underside of the top portion 282 of the seat 276 coming into contact with and damaging the base unit 212. The base unit is thus preferably approximately three inches by two inches by one-half inch.

Embodiment 210 also includes a cover 236 mounted on the circuit board 224, base plate 226 and rubber mount 228 via snap-on means 238 comprising clip structures 240 on the cover 236 and seats 242 on the base plate 226, as with corresponding structures of embodiment 10. However, since, in contrast to embodiment 10, base unit 212 is concealed from casual observance because it is covered by the seat 276, it is not necessary that the cover 236 be visually camouflaged. Consequently, cover 236 simply provides the circuit board 224 (and base plate 226) with protection from dirt, moisture and other environmental hazards. However, cover 236 may be colored and shaped to provide visual camouflage, if desired.

As with base unit 12 of embodiment 10, embodiment 210 also includes a shock sensor 244, a base auditory alarm 246 and a base battery 248 all of which are mounted on the circuit board 224 and electrically connected to the traces 250 thereof for activation of the alarm 246 in response to attempted theft of the bicycle 218.

The base unit 212 also includes a manual switch 254 mounted thereon for arming and disarming the base unit. An led 256 is also mounted on the base unit 212 for notifying the user that the base unit 212 is armed.

Figure 9:
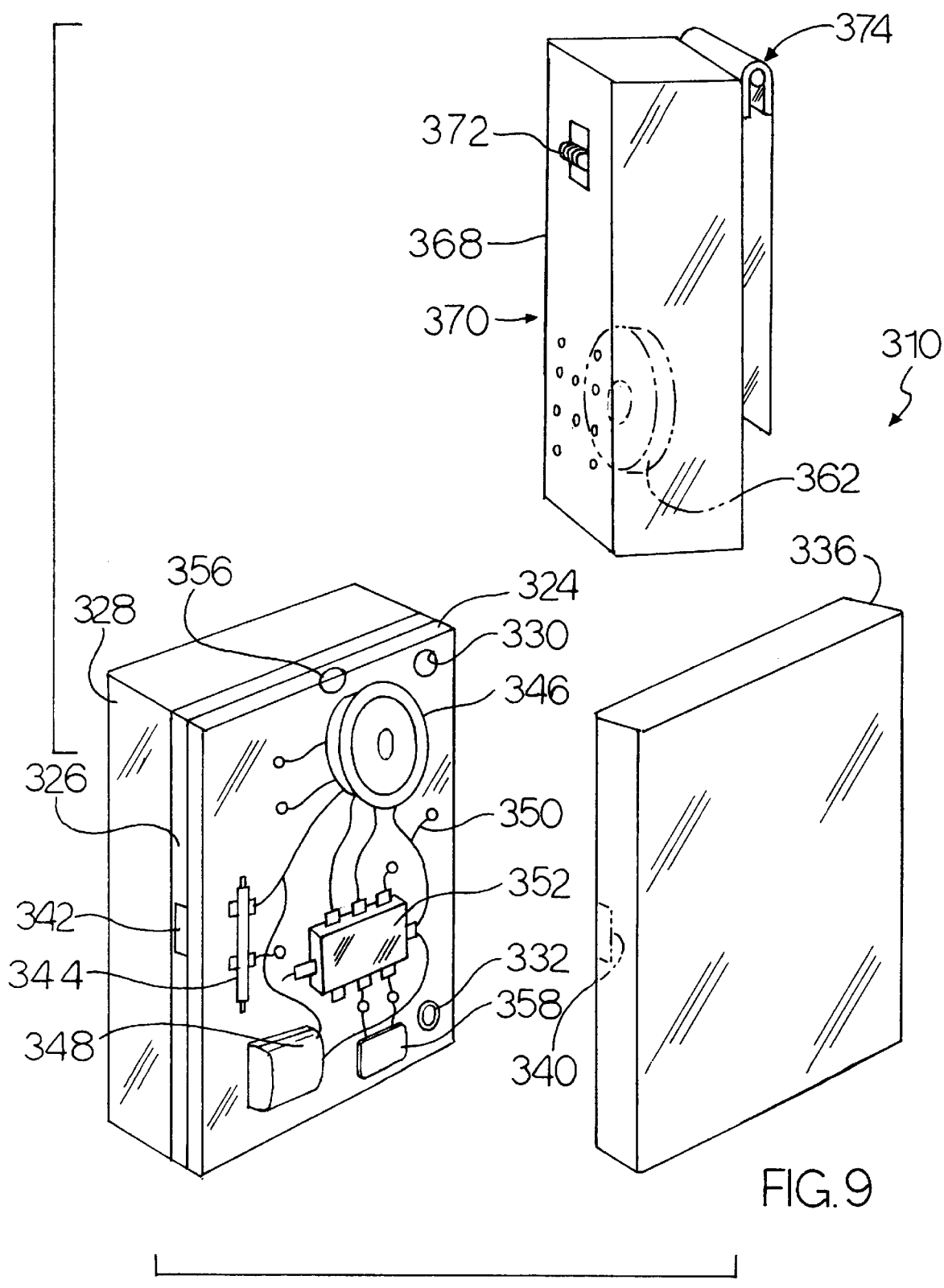
FIG. 9 is a perspective view of a fourth embodiment of the invention showing the component base and remote units thereof.

FIG. 9 shows a fourth embodiment 310 of the invention which includes all the component structures of the third embodiment 210 with the addition of structures providing remote capabilities to the invention. Thus, the fourth embodiment 310 adds essentially the same structures to the third embodiment that the second embodiment 110 adds to the first embodiment. The fourth embodiment 310 thus includes a base radio transceiver 358 mounted on the circuit board 324. The base transceiver 358 is responsive to a shock sensor 344 for emitting an electromagnetic signal to a separate remote transceiver 360 which is electrically and operatively connected to a second (remote) alarm 362 and to a second (remote) microprocessor 364, as with correspondingly numbered structures of embodiment 110. The remote alarm 362 is preferably an auditory alarm, although it may also be a vibration alarm, if desired. A second (remote) battery 366 is electrically connected to the remote microprocessor 364 for powering the remote subsystem or unit 370. The transceiver 360, the remote alarm 362, the remote battery 366 and remote microprocessor 364 are mounted within a casing 368 to facilitate carrying thereof by the user. Thus, in response to sudden movement of the bicycle 318, both alarms 346 and 362 are activated to both scare off the thief and alert the user of the attempted theft. The circuit board 324 is also attached to a rigid base plate 326 which in turn is attached to a rubber mount 328. The circuit board 324 also includes apertures 330 for receiving mounting screws 332. A cover 336 is mounted on the base plate 326 (and circuit board 324) via snap-on means 338 comprising clip structures 340 and seats 342.

The remote subsystem 370 also includes a control switch 372 electrically connected to the remote transceiver 360 for transmitting a signal to the base transceiver 358 for arming and disarming the base unit 312. As with embodiment 210, the led 356 mounted on the base unit 312 signals the user that the base unit 312 is armed. The remote unit 370 preferably also includes a belt clip device 374 to facilitate carrying thereof by the user.

Figure 11:
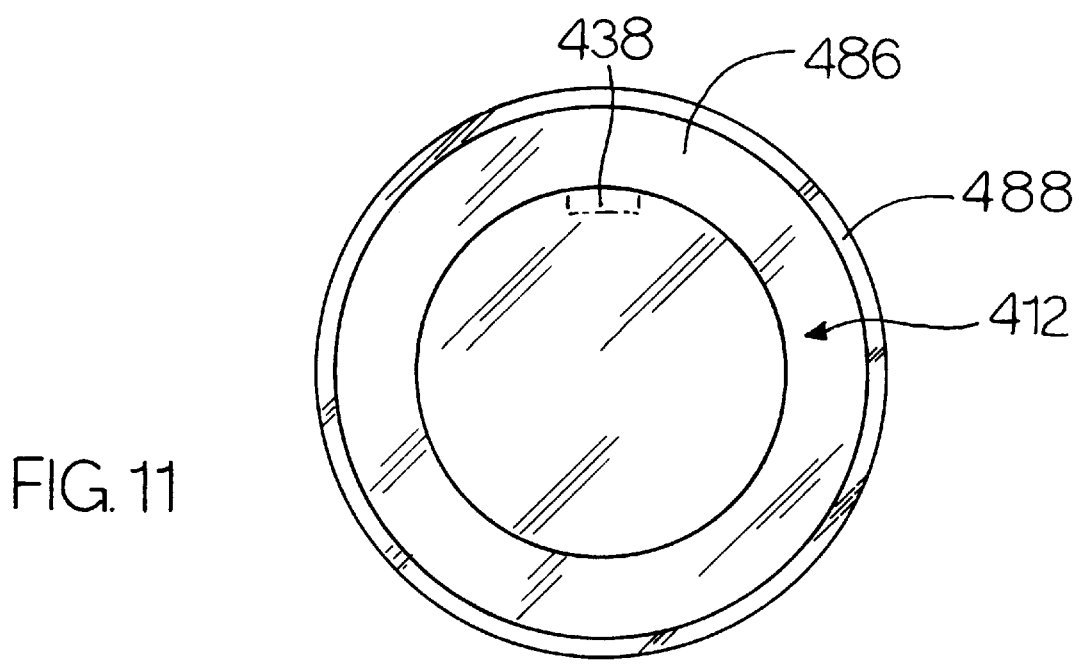
FIG. 11 is a top view of the fifth embodiment of the invention and showing the inner surface of the bottom portion of the water bottle to which attached.
Figure 12:
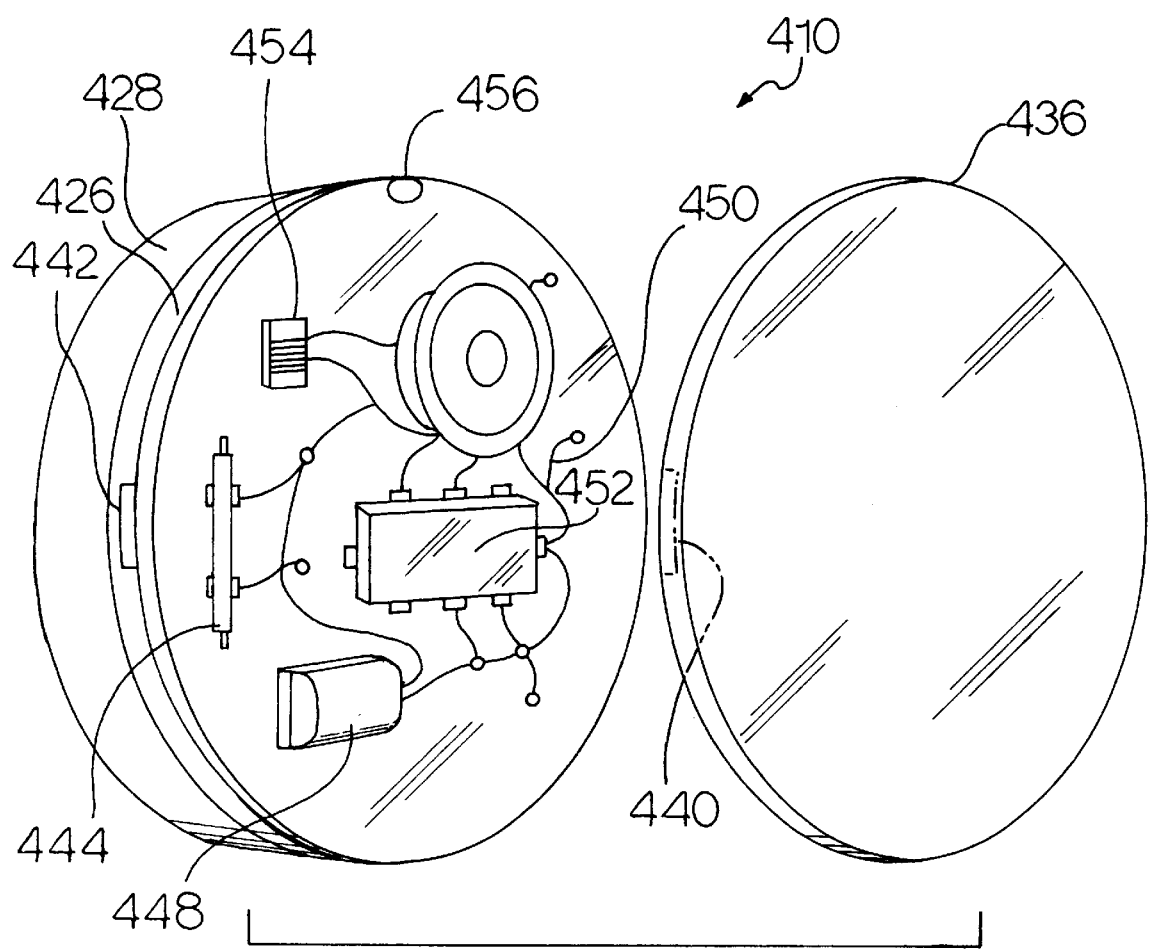
FIG. 12 is a perspective view of the fifth embodiment of the invention showing the cover separated from the base unit thereof.

FIGS. 10, 11 and 12 show a fifth embodiment 410 of the invention. The fifth embodiment 410 is essentially identical to the first and third embodiments 10 and 210 except that the fifth embodiment is adapted for mounting in the water bottle 422 of the bicycle 418 rather than at the water bottle cage 16 or the underside of the bicycle seat 276. Consequently, the base unit 412 does not utilize screws or apertures as in the first and third embodiments 10 and 210 but instead is bonded to the water bottle at the inner surface 486 of the lower member 488 thereof. The lower member 488 is preferably manually separable from the upper member 490 of the bottle 422 but retained thereon when joined together via conventional ridge structure 492 on the lower member engaging a recess 494 in the upper member. When the upper and lower members 488 and 490 are joined together, the water bottle 422 essentially has a "false bottom" such that the upper member 490 is a complete container for preventing the water placed therein from exiting the upper member 490 and entering the lower member 488 and damaging the electronic components and circuitry therein. The base unit 212 is also dimensioned so that its length and width are small relative to the diameter of the water bottle 422 so that the base unit can fit within the diametrical confines of the lower member 488 and the water bottle 422. The base unit is preferably circular and approximately three inches in diameter and one-half inch in thickness. Thus, when the lower member 488 is attached to the upper member 490, the base unit 412 is positioned at a location in which it is generally covered by water bottle component members thereby placing it out of view.

Embodiment 410 also includes a cover 436 mounted on the circuit board 424, base plate 426 and rubber mount 428 via snap-on means 438 comprising clip structures 440 on the cover 436 and seats 442 on the base plate 426, as with corresponding structures of embodiments 10 and 210. However, since, in contrast to embodiments 10 and 210, base unit 412 is concealed from casual observance because it is covered by the bottle 422 when its members are joined together, it is not necessary that the cover 436 be visually camouflaged. Consequently, cover 436 simply provides the circuit board 424 (and base plate 426) with protection from dirt, moisture and other environmental hazards. Optionally, since the base unit 412 is completely covered when the members 488 and 490 are joined together and the system 410 is in use, the base unit may be utilized without a cover, if desired. Additionally, the mount 428 and base plate 426 may be composed of the same material as the lower member 488 and integral and unitary therewith.

As with base unit 12 of embodiment 10 and base unit 212 of embodiment 210, embodiment 410 also includes a shock sensor 444, a base auditory alarm 446 and a base battery 448 all of which are mounted on the circuit board 424 and electrically connected to the traces 450 thereof for activation of the alarm 446 in response to attempted theft of the bicycle 418.

The base unit 412 also includes a manual switch 454 mounted thereon for arming and disarming the base unit. An led 456 is also mounted on the base unit 412 for notifying the user that the base unit 412 is armed.

Figure 13:
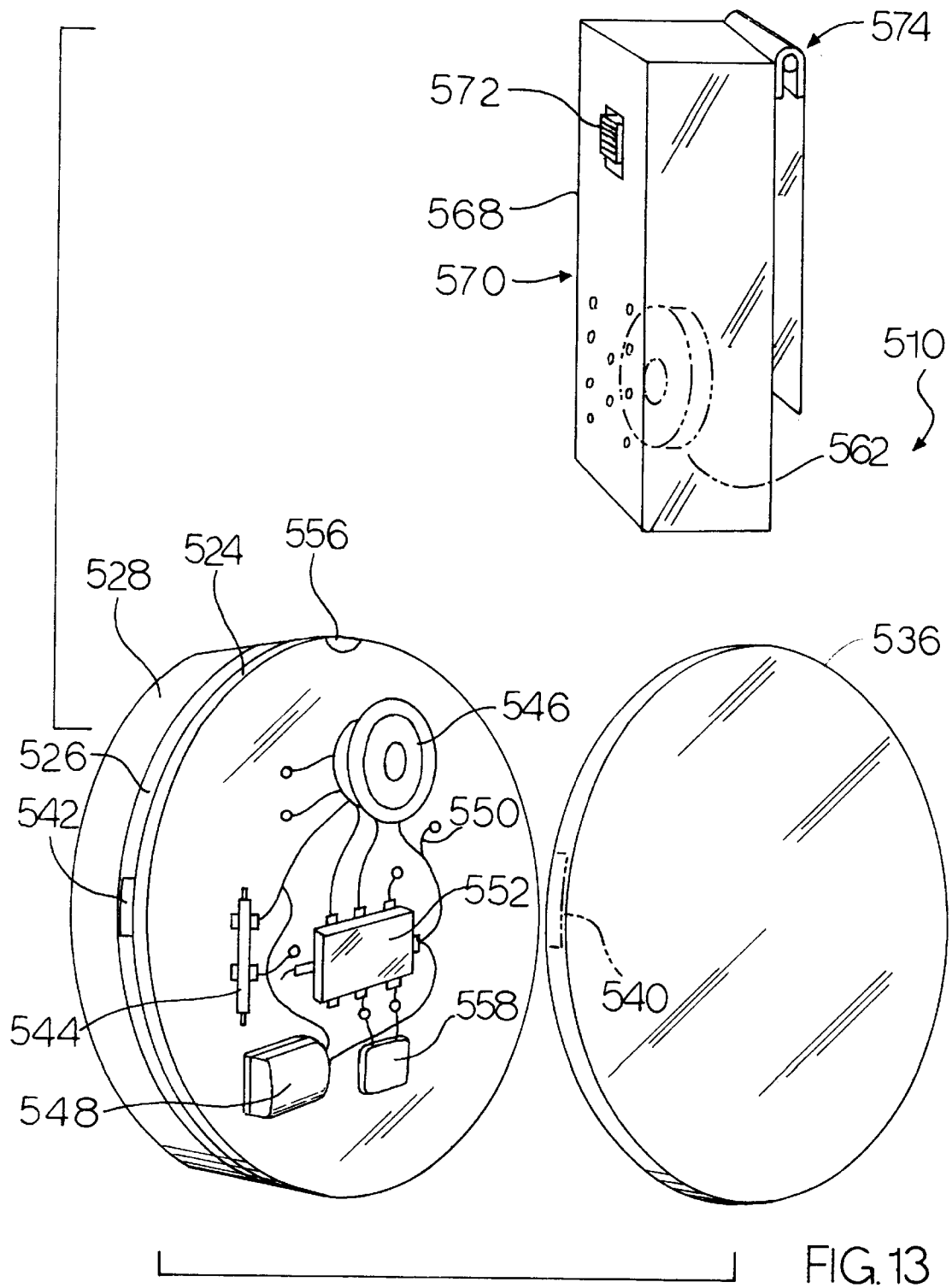
FIG. 13 is a perspective view of a sixth embodiment of the invention showing the component base and remote units thereof.

FIG. 13 shows a sixth embodiment 510 of the invention which Includes all the component structures of the fifth embodiment 410 with the addition of structures providing remote capabilities to the invention. Thus, the sixth embodiment 510 adds essentially the same structures to the fifth embodiment 410 that the fourth embodiment 310 adds to the third embodiment and that the second embodiment 110 adds to the first embodiment 10. The sixth embodiment 510 thus includes a base radio transceiver 558 mounted on the circuit board 524. The base transceiver 558 is responsive to a shock sensor 544 for emitting an electromagnetic signal to a separate remote radio transceiver 560 which is electrically and operatively connected to a second (remote) alarm 562 and to a second (remote) microprocessor 564, as with correspondingly numbered structures of embodiments 310 and 110. The sixth embodiment 510 also includes a remote alarm 562, a second (remote) battery 566 electrically connected to the remote microprocessor 564 for powering the remote subsystem or unit 570 and a casing 568 for containing these components and to facilitate carrying thereof by the user. The circuit board 524 is also attached to a rigid base plate 526 which in turn is attached to a rubber mount 528. A cover 536 is mounted on the base plate 526 (and circuit board 524) via snap-on means 538 comprising clip structures 540 and seats 542.

The remote subsystem 570 also includes a control switch 572 electrically connected to the remote transceiver 560 for transmitting a signal to the base transceiver 558 for arming and disarming the base unit 512. As with embodiment 210, the led 556 mounted on the base unit 512 signals the user that the base unit 512 is armed. The remote unit 570 preferably also includes a belt clip device 574 to facilitate carrying thereof by the user. Since the above set forth elements of embodiment 510 are identical in structure and function to those of correspondingly numbered elements of embodiments 410 and 210 except as noted, they are not described in further detail in order to promote brevity.

Figure 14:
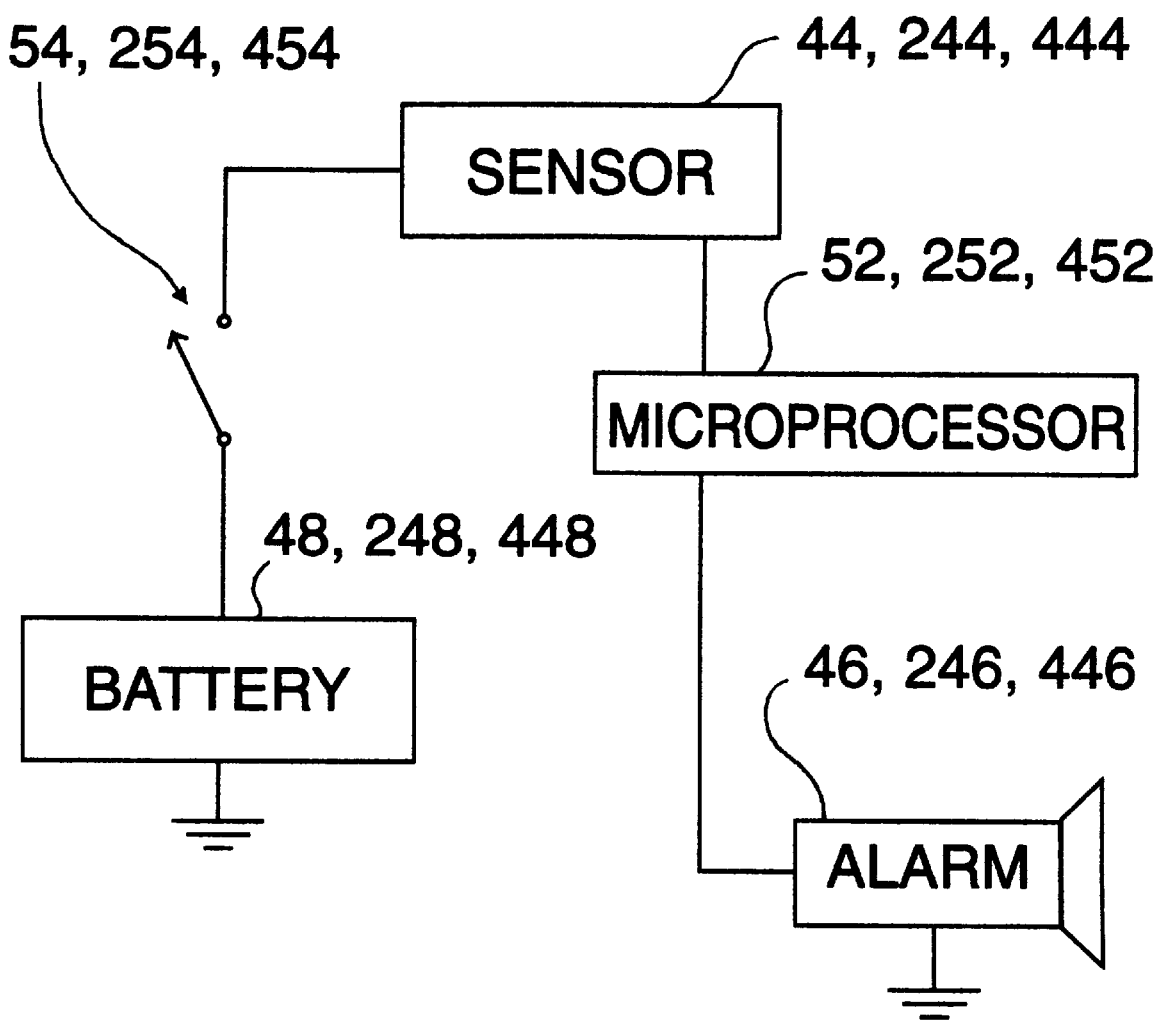
FIG. 14 is a schematic diagram of the first, third and fifth embodiments of the invention.

FIG. 14 shows the schematic block diagrams of the first, third and fifth embodiments 10, 210 and 410. The electronic components and electronic circuitry of these embodiments are identical in structure and function to those correspondingly numbered. These embodiments include the control switch 54, 254 and 454 electrically connected to the battery 48, 248 and 448 for arming and disarming the system. A terminal of the switch 54, 254 and 454 is electrically connected to the sensor 44, 244 and 44 which when activated transmits current to the microprocessor 52, 252 and 452 which outputs a signal to the alarm 46, 246 and 446. The microprocessor 52, 252 and 452 preferably produces a siren type sound signal. The microprocessor 52, 252 and 452 sets the duration of the sound output of the alarm 46, 246 and 446 so that it sounds for preferably approximately one minute.

Figure 15:
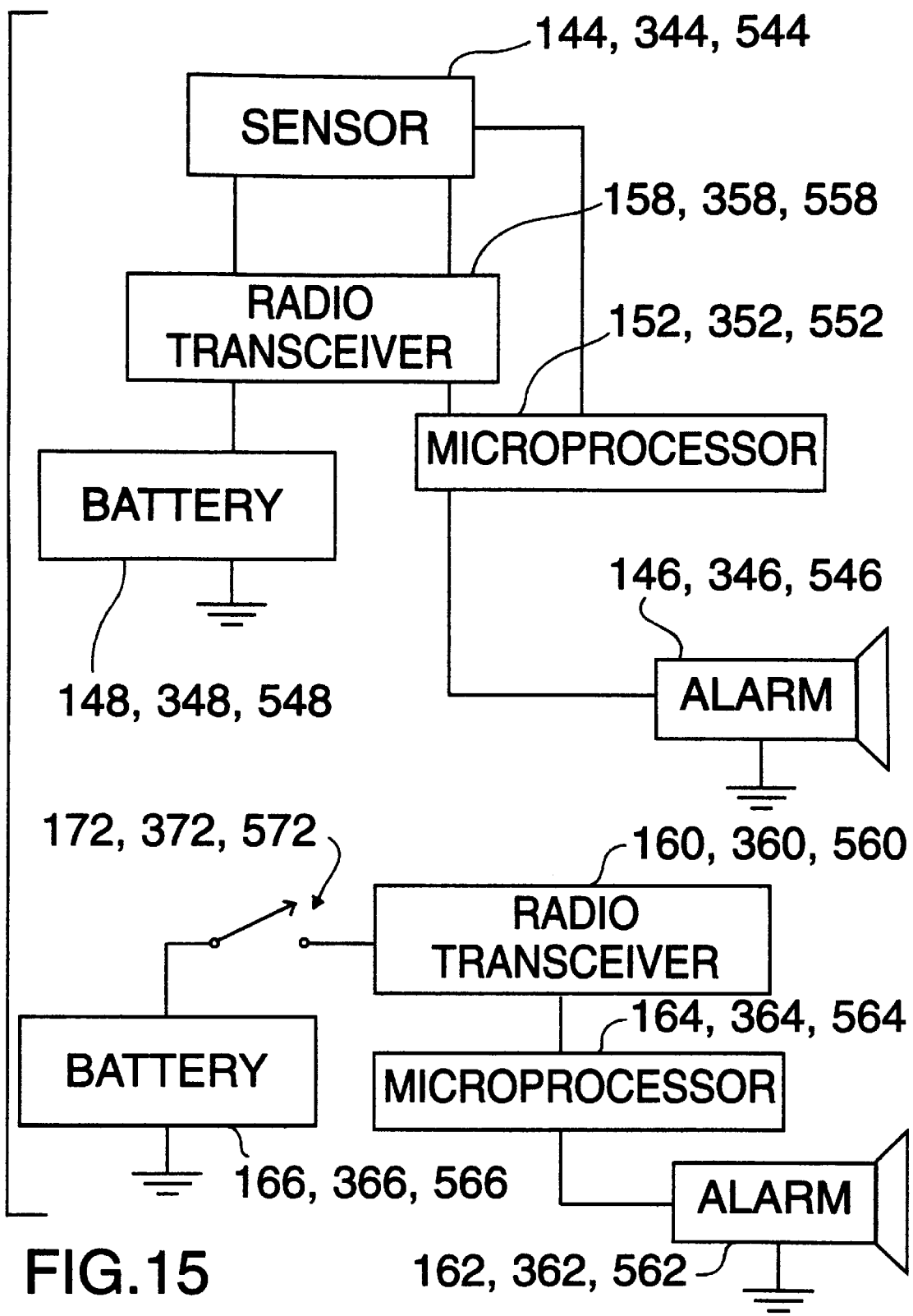
FIG. 15 is a schematic diagram of the second, fourth and sixth embodiments of the invention.

FIG. 15 shows the schematic block diagrams of the second, fourth and sixth embodiments 110, 310 and 510. The electronic components and electronic circuitry of these embodiments are identical in structure and function to those correspondingly numbered. These embodiments include the base radio transceiver 158, 358 and 558 electrically connected to the base battery 148, 348 and 548, the sensor 144, 344 and 544 and the microprocessor 152, 352 and 552 and include the remote control switch 172, 372 and 572 electrically connected to the remote battery 166, 366 and 566 for remotely arming and disarming the system. A terminal of the switch 172, 372 and 572 is electrically connected to the remote radio transceiver 160, 360 and 560 which (when the switch 172, 372 and 572 is closed) transmits a radio signal to the base transceiver 158, 358 and 558 to close the circuit between the base battery 148, 348 and 558 and the sensor 144, 344 and 544 and thereby arm (or disarm) the system. When the system is armed and the sensor 144, 344 and 544 is activated, it transmits current to the base microprocessor 152, 352 and 552 which transmits a siren type sound output signal to the alarm 146, 346 and 546 which is thereby activated for a period of approximately one minute. The activation of the sensor 144, 344 and 544 also transmits a signal to the base transceiver 158, 358 and 558 to transmit a radio signal to the remote transceiver 160, 360 and 560 which transmits a signal to the remote microprocessor 164, 364 and 564 which transmits a signal output of one minute duration to the remote alarm 162, 362 and 562.

Figure 16:
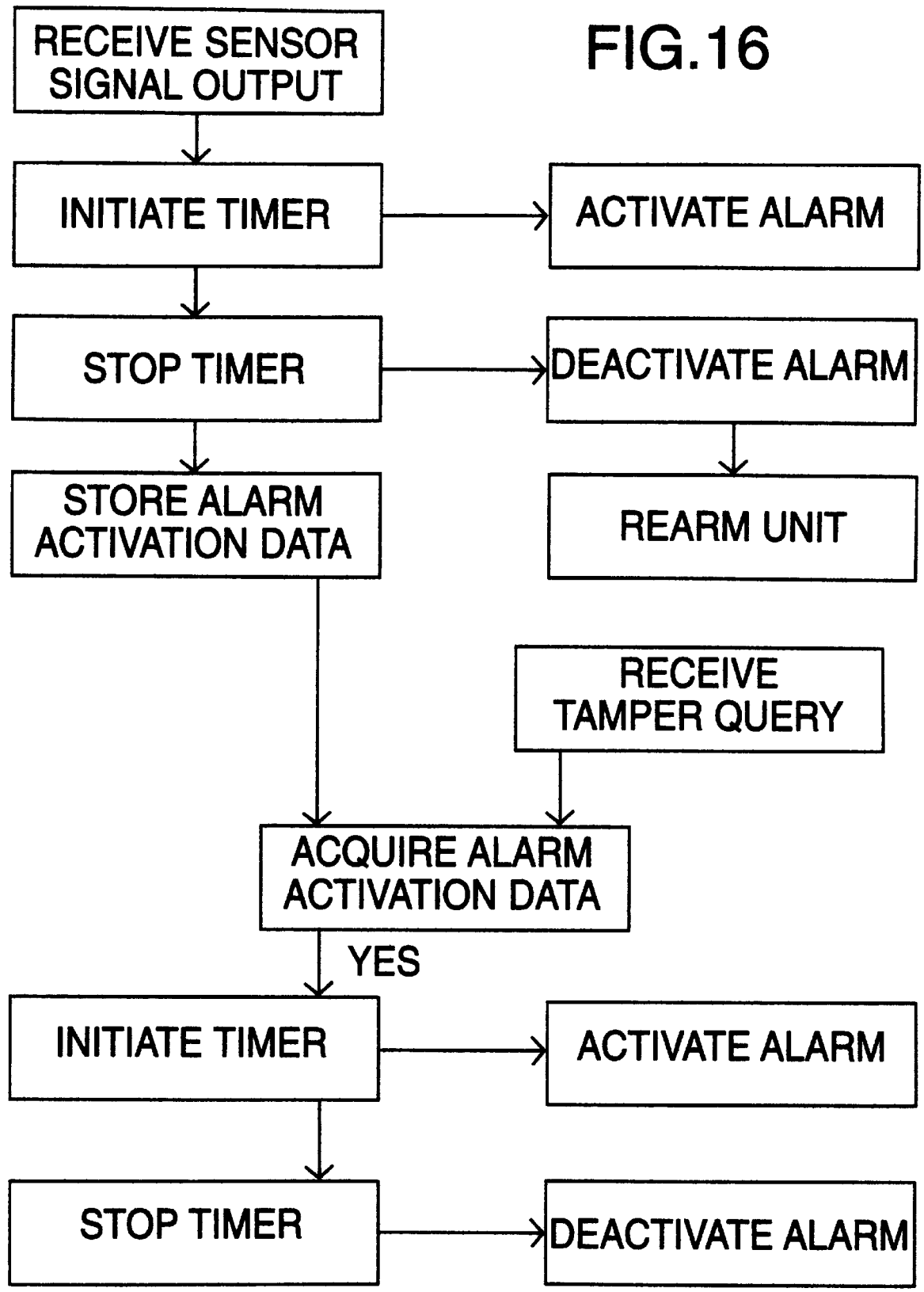
FIG. 16 is a flowchart of the first software program of the embodiments of the invention.

The base microprocessor 52, 152, 252, 352, 452 and 552 has a first software program (shown in FIG. 16) which in response to receipt of the sensor 44, 144, 244, 344, 444 and 544 signal initiates its timer and activates the base alarm 46, 146, 246, 346, 446 and 546. The software program stops the timer at a predetermined interval and deactivates the alarm 46, 146, 246, 346, 446 and 546. Subsequently, the base unit 12, 112, 212, 312, 412 and 512 is rearmed and alarm activation data (that the alarm has been activated) is stored in its memory. In response to a tamper query i.e., that the alarm has been activated and presumably an attempted theft has occurred, the software program acquires the alarm activation data and initiates its timer and activates the base alarm 46, 146, 246, 346, 446 and 546. The software program stops the timer after a predetermined interval deemed acceptable for notifying the user of the attempted theft (preferably the desired interval is that which results in short beep type sound outputs) and deactivates the alarm 46, 146, 246, 346, 446 and 546.

Figure 17:
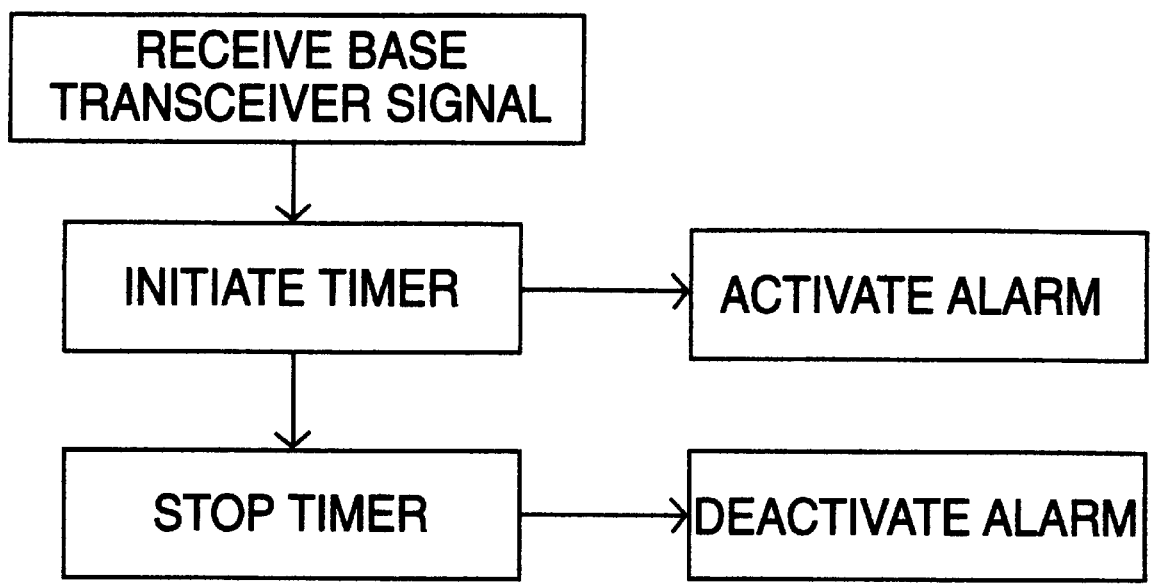
FIG. 17 is a flowchart of the second software program of the second, fourth and sixth embodiments of the invention.

The remote microprocessor 164, 364 and 564 has a second software program (shown in FIG. 17) which in response to the signal received from the transceiver 160, 360 and 560 (transmitted thereto via radio signal from the transceiver 158, 358 and 558 in response to sensor 144, 344 and 544 output) initiates its timer and activates the remote alarm 162, 362 and 562. The software program stops the timer after a predetermined interval and deactivates the remote alarm 162, 362 and 562.

Accordingly, there has been provided, in accordance with the invention, a system which in response to sudden movement of a bicycle protected thereby activates an alarm to thwart attempted theft thereof or alert the user of attempted or actual theft thereof and which is cryptically mounted on the bicycle to preclude disablement thereof by a would be thief and thus fully satisfies the objectives set forth above. It is to be understood that all terms used herein are descriptive rather than limiting. Although the invention has been specifically described with regard to the specific embodiments set forth herein, many alternative embodiments, modifications and variations will be apparent to those skilled in the art in light of the disclosure set forth herein. Accordingly, it is intended to include all such alternatives embodiments, modifications and variations that fall within the spirit and scope of the invention as set forth in the claims hereinbelow.

What is claimed is:

1. An anti-theft alarm system for a bicycle, comprising:

a circuit board;

an alarm mounted on said circuit board;

a shock sensor mounted on said circuit board, said alarm responsive to said shock sensor for activation thereof;

a battery mounted on said circuit board and electrically connected to said alarm and said shock sensor, said circuit board dimensionally sized and shaped to conform to that of a selected component or accessory of the bicycle for secure mounting thereof at a location on said selected component or accessory preventing visual discernment of said circuit board from nonanti-theft components and accessories of the bicycle.

2. The alarm system of claim 1 further including a rigid back plate attached to said circuit board for providing structural strength thereto, said back plate composed of an insulating material to electrically isolate said circuit board from components and accessories of the bicycle.

3. The alarm system of claim 2 wherein said back plate is integral with said selected component or accessory.

4. The alarm system of claim 1 further including a cover for said circuit board, said cover having a color and texture selected to generally match that of said selected component or accessory for visual camouflaging thereof.

5. The alarm system of claim 1 further including a base transceiver mounted on said circuit board, a casing, a remote alarm, a remote microprocessor electrically connected to said remote alarm, and a remote transceiver, said remote alarm, remote microprocessor and remote transceiver mounted within said casing and said remote transceiver electrically connected to said remote microprocessor for receiving electromagnetic signals emitted by said base transceiver in response to activation of said shock sensor and activating said remote alarm in response thereto.

6. The alarm system of claim 5 further including a control switch mounted on casing for remote control including activation and deactivation of said electronic circuitry and said alarm.

7. The alarm system of claim 1 further including a resilient mount attached to said circuit board and positioned between said circuit board and said selected component for absorbing shocks transmitted thereto and generated during use of the bicycle.

8. The alarm system of claim 1 wherein said component or accessory includes a water bottle, said circuit board mounted on an inner surface of said water bottle, said circuit board being generally planar and thereby shaped and positioned within said water bottle at a location enabling said water bottle to be properly positioned on the bicycle for use thereof as a bicycle accessory.

9. The alarm system of claim 1 wherein said component or accessory includes a seat, said circuit board mounted on an inner surface of a seat frame member of said seat.

10. The alarm system of claim 1 wherein said component or accessory includes a water bottle cage, said circuit board mounted on rod members of said bottle cage and secured to a component frame portion of the bicycle and securely retaining said rod members onto the component frame portion of the bicycle, said circuit board mounted at a location on said rod members selected to provide coverage and concealment thereof by a water bottle when the water bottle is positioned in the water bottle cage.

11. An anti-theft alarm system for a bicycle, comprising:
a circuit board having a base radio transceiver;
a shock sensor mounted on said circuit board;
a base alarm mounted on said circuit board and electrically responsive to said shock sensor for activation thereof;
a battery mounted on said circuit board and electrically connected to said alarm and said shock sensor, said circuit board dimensionally sized and shaped to conform to that of a selected component or accessory of the bicycle for secure mounting thereof at a location on said selected component or accessory preventing visual discernment of said circuit board from nonanti-theft components and accessories of the bicycle;
a casing;
a remote radio transceiver mounted in said casing for carrying thereof by a user, said base radio transceiver receiving signals from said remote radio transceiver for remote operation of said circuit board.

12. The alarm system of claim 11 further including a rigid back plate attached to said circuit board for providing structural strength thereto, said back plate composed of an electrically insulating material to electrically isolate said circuit board from components and accessories of the bicycle.

13. The alarm system of claim 12 wherein said back plate is integral with said selected component or accessory.

14. The alarm system of claim 11 wherein said circuit board has sides open to the environment and further including a cover for said circuit board, said cover and said sides open to the environment having a color and texture selected to generally match that of said selected component or accessory for visual camouflaging thereof.

15. The alarm system of claim 11 further including a control switch mounted on casing for remote control including activation and deactivation of said electronic circuitry and said alarm.

16. The alarm system of claim 11 further including a resilient mount attached to said circuit board and positioned between said circuit board and said selected accessory for absorbing shocks transmitted thereto and generated during use of the bicycle.

17. The alarm system of claim 11 wherein said component or accessory includes a water bottle, said circuit board mounted on an inner surface of said water bottle, said circuit board sufficiently compact and positioned at a location within said water bottle to allow said water bottle to be properly positioned on the bicycle for use thereof as a bicycle accessory.

18. The alarm system of claim 11 wherein said component or accessory includes a seat, said circuit board mounted on an inner surface of a seat frame member of said seat.

19. The alarm system of claim 11 wherein said component or accessory includes a water bottle cage, said circuit board mounted on rod members of said bottle cage and secured to a component frame portion of the bicycle and securely retaining said rod members onto the component frame portion of the bicycle.

20. An anti-theft alarm system for a bicycle, comprising:
a circuit board, said circuit board open to the environment at sides thereof;
an alarm mounted on said circuit board;
a shock sensor mounted on said circuit board, said alarm responsive to said shock sensor for activation thereof;
a battery mounted on said circuit board and electrically connected to said alarm and said shock sensor, said circuit board dimensionally sized and shaped to conform to that of a selected component or accessory of the bicycle for secure mounting thereof at a location on said selected component or accessory preventing visual discernment of said circuit board from nonanti-theft components and accessories of the bicycle.

21. The alarm system of claim 20 further including a rigid back plate attached to said circuit board for providing structural strength thereto, said back plate composed of an electrically insulating material for electrically isolating said circuit board from components and accessories of the bicycle.

22. The alarm system of claim 20 further including a cover for said circuit board, said cover and said sides open to the environment having a color and a texture selected to generally match that of said selected component or accessory for visual camouflaging thereof.

23. The alarm system of claim 20 wherein said component or accessory includes a water bottle, said water bottle including an upper member and a lower member manually detachable from said upper member, said upper member comprising a container for holding liquid, said circuit board mounted on an inner surface of said lower member, said circuit board being generally planar and thereby shaped and positioned within said water bottle at a location enabling it to be properly positioned on the bicycle for use thereof as a bicycle accessory.

24. The alarm system of claim 20 wherein said component or accessory includes a water bottle cage, said circuit board mounted on rod members of said bottle cage and secured to a component frame portion of the bicycle and securely retaining said rod members onto the component frame portion of the bicycle, said circuit board being planar and mounted at a location on said rod members selected to provide coverage and concealment thereof by a water bottle when the water bottle is positioned in the water bottle cage.

\* \* \* \* \*